April 22, 1969     T. H. BELL     3,439,811
BREAD STORAGE RACK
Filed March 20, 1967
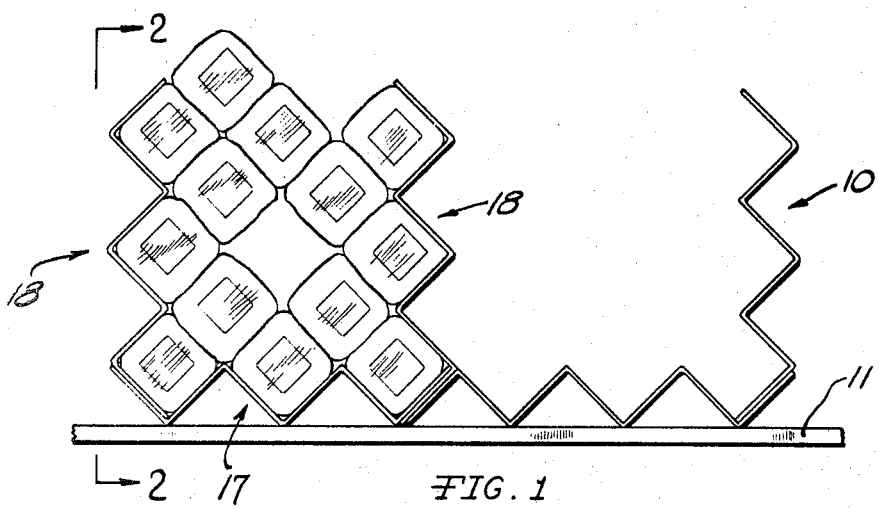
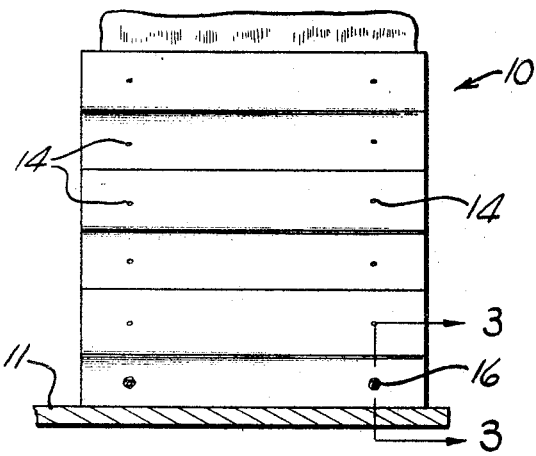
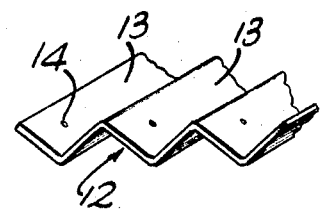
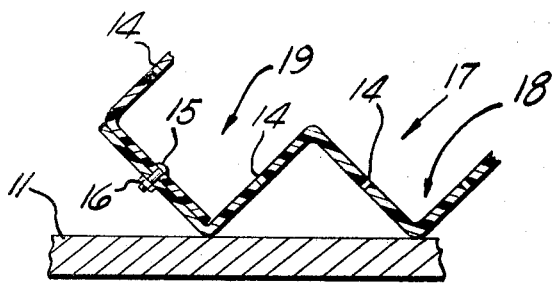
INVENTOR.
THOMAS H. BELL
BY
Barnes, Kisselle, Raisch & Choate
ATTORNEYS United States Patent Office 3,439,811
Patented Apr. 22, 1969

3,439,811
BREAD STORAGE RACK
Thomas H. Bell, 2411 Fairfax Road,
Lansing, Mich. 48910
Filed Mar. 20, 1967, Ser. No. 624,347
Int. Cl. A47f 7/00, 5/16
U.S. Cl. 211—49                             14 Claims

ABSTRACT OF THE DISCLOSURE

The bread storage rack disclosed herein comprises a plurality of sections, each of which has angularly related surfaces, alternate surfaces being parallel to one another and adjacent surfaces being perpendicular to one another. The sections are bolted together to form a base section and spaced vertical wall sections in a manner such that the surfaces extend at an angle to the horizontal and vertical. The loaves of bread are positioned within the rack with the loaves along the base and wall sections engaging two surfaces thereof. Additional loaves are placed upon the aforementioned loaves and are supported by the two surfaces of adjacent underlying loaves of bread. In this fashion, the weight of each loaf of bread is distributed over two surfaces and the bread can be arrayed to greater depth, that is, more loaves can be stacked one on another without displacing the bread.

Background of the invention

This invention relates to bread storage racks and particularly to bread storage racks adapted to be utilized in the display of loaves of bread in retail stores.

In the display of bread in retail stores, it is conventional to stack the bread upon shelves. Thus, a row of loaves of bread is placed upon the shelf and additional loaves are stacked on top of this row of loaves of bread. This form of display results in crushing of the underlying loaves of bread. It is conventional for the retailer to return such crushed loaves of bread to the bakery for credit resulting in substantial cost to the bakery. Where the crushed bread is subsequently displayed on top of a fresh supply, the unattractive display hinders further sales. If, as often occurs, the customer removes the fresh loaf from beneath the crushed loaf, the resultant shifting of the loaves of bread causes further damage to the bread.

Among the objects of the invention are to provide a bread rack which will minimize the crushing of the loaves; which is low in cost; which can be readily applied to conventional shelves; and which can be adjusted for lateral width with a minimum use of tools.

Summary

The bread storage rack disclosed herein comprises a plurality of sections, each of which has angularly related surfaces, alternate surfaces being parallel to one another and adjacent surfaces being perpendicular to one another. The sections are bolted together to form a base section and spaced vertical wall sections in a manner such that the surfaces extend at an angle to the horizontal and vertical. The loaves of bread are positioned within the rack with the loaves along the base and wall sections engaging two surfaces thereof. Additional loaves are placed upon the aforementioned loaves and are supported by the two surfaces of adjacent underlying loaves of bread. In this fashion, the weight of each loaf of bread is distributed over two surfaces and the bread can be arrayed to greater depth, that is, more loaves can be stacked one on another without displacing the bread.

Description of the drawings

FIG. 1 is a fragmentary side elevational view of a bread storage rack embodying the invention.

FIG. 2 is an end view of the bread storage rack.

FIG. 3 is a fragmentary sectional view taken along the line 3—3 in FIG. 2.

FIG. 4 is a perspective view of a section utilized in the bread storage rack.

Description

Referring to FIGS. 1 and 2, a bread storage rack 10 embodying the invention is adapted to be placed on a conventional shelf 11 in a retail store such as a grocery. The bread storage rack 10 is made up of a plurality of identical sections 12 (FIG. 4). Each section is made of uniformly thick material such as plastic or sheet metal and comprises angularly related surfaces 13, alternate surfaces being parallel and adjacent surfaces being perpendicular to one another. As shown, each section 12 is formed with three pairs of angularly related surfaces. Each surface of section 12 is formed with openings 14 and the sections can be assembled by inserting bolts 15 through aligned openings 14 and threading bolts 16 thereon to provide, as shown in FIG. 1, a base section 17 and spaced vertical wall sections 18.

As shown in FIG. 3, when so assembled, the base section 17 provides generally V-shaped pockets 19 that are adapted to support a loaf of bread in what might be termed angular relationship to the shelf 11, that is, each loaf is supported by two surfaces 13 of the base 17. At the area of juncture of the vertical section 18 and base section 17, a pocket 19 is provided that extends along three sides of bread, that is, the pocket has three sides of substantially equal width.

The loaves of bread are laid in the base 17 and then stacked one on another as shown in FIG. 1. Each loaf of bread is supported by two surfaces thereby minimizing the load on each underlying loaf of bread and minimizing the tendency of the loaf to be crushed. The endmost loaves are supported by two underlying surfaces and one side surface provided by the vertical sections 18. Thus, the weight bearing surface is extended or doubled permitting a greater number of loaves of bread to be stacked vertically without crushing. If a customer removes a loaf of bread as, for example, shown in FIG. 1, the remaining loaves tend to stay in position until succeeding loaves remove the load bearing surfaces in which instance the loaves would fall into the opening formed by removal of a loaf of bread from the middle rather than the top of the stack.

The horizontal width of the rack can be extended by providing additional sections as shown to the right in FIG. 1. Moreover, the spacing between adjacent vertical walls 18 can be changed to accommodate any length of shelf.

Although the invention has been described as used in the stacking and dispensing of bread, it can also be used for stacking and dispensing other soft, crushable products.

I claim:
1. In a bread storage rack or the like, the combination comprising:
   a base section,
   spaced vertical wall sections connected to said base section,
   said base and wall sections being made of substantially uniformly thick material,
   each said base section and wall sections comprising a plurality of right angularly related surfaces,
   adjacent surfaces being substantially perpendicular to one another,
   alternate surfaces being substantially parallel, the surfaces of said base and wall sections at the area of juncture defining a three sided bread receiving pocket which is substantially square, whereby loaves of bread may be supported in said rack, each loaf being supported by two surfaces of the base and wall sections or two surfaces of adjacent loaves of bread.

2. The combination set forth in claim 1 wherein said base and wall sections are made of plastic.

3. The combination set forth in claim 2 including means removably interconnecting said base and wall sections.

4. The combination set forth in claim 3 wherein said last-mentioned means comprises a plurality of openings in each of said sections and fastening means extending through said opening.

5. The combination set forth in claim 4 wherein said openings are provided in each of the surfaces of said base section.

6. The combination set forth in claim 2 wherein each said section comprises three pairs of angularly related surfaces.

7. In a bread storage rack, the combination comprising:
a generally horizontal base and spaced generally vertical walls extending upwardly from said base,
said base and said vertical walls comprising a plurality of pairs of surfaces at substantially right angles to one another,
each said surface having a width substantially equal to the width of a loaf of bread,
each said surface having a length substantially greater than its width and at least as long as a loaf of bread,
each pair of said surfaces defining a bread receiving pocket adapted to substantially receive and be engaged by two sides of a loaf of bread whereby loaves of bread may be supported within said rack in stacked relation to one another with the sides thereof extending at angles to the horizontal and to the vertical.

8. The combination set forth in claim 7 wherein said angularly related surfaces at the juncture of said base and each said vertical wall define a space having three sides having a size substantially equal to the size of a loaf of bread.

9. In a bread storage rack or the like, the combination comprising:
a base section,
spaced vertical wall sections connected to said base section,
each said base section and wall sections comprising a plurality of angularly related surfaces,
adjacent surfaces being substantially perpendicular to one another,
alternate surfaces being substantially parallel,
the surfaces of said base and wall sections at the area of juncture defining a bread receiving pocket which is substantially square, whereby loaves of bread may be supported in said rack, each loaf being supported by two surfaces of the base and wall sections or two surfaces of adjacent loaves of bread,
said base and wall sections being made of substantially uniformly thick material.

10. The combination set forth in claim 9 wherein said base and wall sections are made of plastic.

11. The combination set forth in claim 9 including means removably interconnecting said base and wall sections.

12. The combination set forth in claim 11 wherein said last-mentioned means comprises a plurality of openings in each of said sections and fastening means extending through said openings.

13. The combination set forth in claim 12 wherein said openings are provided in each of the surfaces of said base section.

14. The combination set forth in claim 9 wherein each said section comprises three pairs of angularly related surfaces.

References Cited

UNITED STATES PATENTS

| 2,886,182 | 5/1959 | Dauman | 211—49 |
| 3,198,340 | 8/1965 | Tokash | 211—49 |
| 3,229,432 | 1/1966 | Renfro | 52—589 XR |

FOREIGN PATENTS 667,513  3/1952  Great Britain.

CHANCELLOR E. HARRIS, Primary Examiner.

U.S. Cl. X.R.

211—135